US008350503B2

United States Patent
Kawamura et al.

(10) Patent No.: US 8,350,503 B2
(45) Date of Patent: Jan. 8, 2013

(54) BRUSHLESS MOTOR DEVICE

(75) Inventors: Satoshi Kawamura, Tokyo (JP); Aya Nishikawa, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 737 days.

(21) Appl. No.: 12/520,779

(22) PCT Filed: Nov. 8, 2007

(86) PCT No.: PCT/JP2007/071730
§ 371 (c)(1),
(2), (4) Date: Jun. 22, 2009

(87) PCT Pub. No.: WO2008/114473
PCT Pub. Date: Sep. 25, 2008

(65) Prior Publication Data
US 2009/0302793 A1    Dec. 10, 2009

(30) Foreign Application Priority Data

Mar. 16, 2007 (JP) ................................. 2007-068958

(51) Int. Cl.
*H02P 6/00* (2006.01)
(52) U.S. Cl. ......... 318/400.01; 318/400.37; 318/400.38; 318/700
(58) Field of Classification Search ............. 318/400.01, 318/400.37, 400.38, 700
See application file for complete search history.

(56) References Cited

U.S. PATENT DOCUMENTS

| 5,493,187 A | 2/1996 | Iijima |
| 7,541,760 B2 * | 6/2009 | Lin et al. ................ 318/400.01 |
| 8,040,085 B2 * | 10/2011 | Kawamura et al. ...... 318/400.01 |
| 2002/0117914 A1 | 8/2002 | Doi et al. |
| 2003/0227271 A1 * | 12/2003 | Shindo .......................... 318/439 |
| 2004/0036429 A1 * | 2/2004 | Fujita et al. ................... 318/254 |

FOREIGN PATENT DOCUMENTS

| DE | 10359713 A1 | 7/2004 |
| EP | 0994165 A2 | 9/1999 |
| JP | 10-248234 A | 9/1998 |
| JP | 2002-252958 A | 9/2002 |
| JP | 2003-274623 A | 9/2003 |
| JP | 2004-15925 A | 1/2004 |

* cited by examiner

*Primary Examiner* — Kawing Chan
(74) *Attorney, Agent, or Firm* — Birch, Stewart, Kolasch & Birch, LLP

(57) ABSTRACT

An n-phase brushless motor device is provided. The device includes a magnet for magnetic pole position detection having a number of poles twice as many as that of a rotor and fixed to a face perpendicular to a rotation axis of the rotor; n main Hall elements arranged opposite to the magnet, for detecting a magnetic pole position of the rotor; n sub Hall elements arranged in such a way as to have an offset in a direction of a periphery with respect to the main Hall elements, for detecting the magnetic pole position; and a control unit for counting "2" according to a change in an output pattern of the main Hall elements, for counting "1" when the output pattern is the same as that of the sub Hall elements at a predetermined timing, and for controlling a rotation of the rotor according to these counted values.

7 Claims, 18 Drawing Sheets

FIG. 2
Valve Lifting Amount-Hall IC Count Number Characteristic
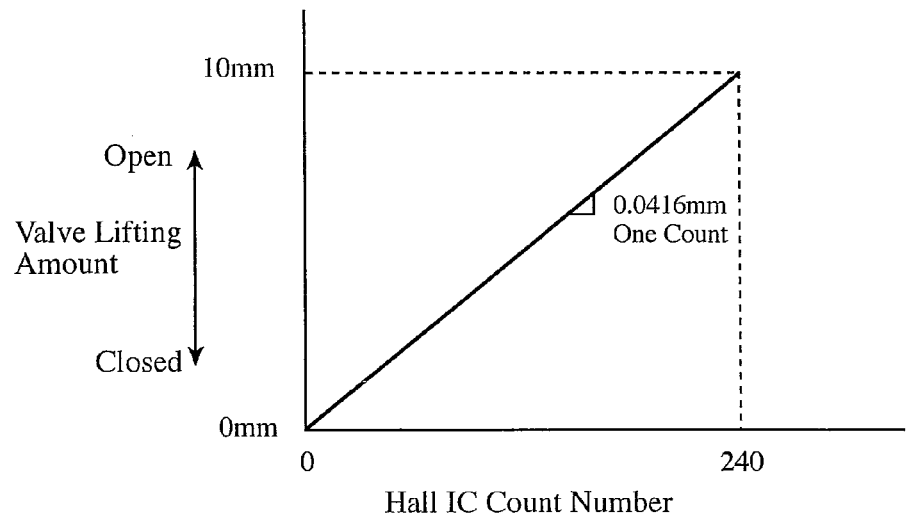
FIG. 3
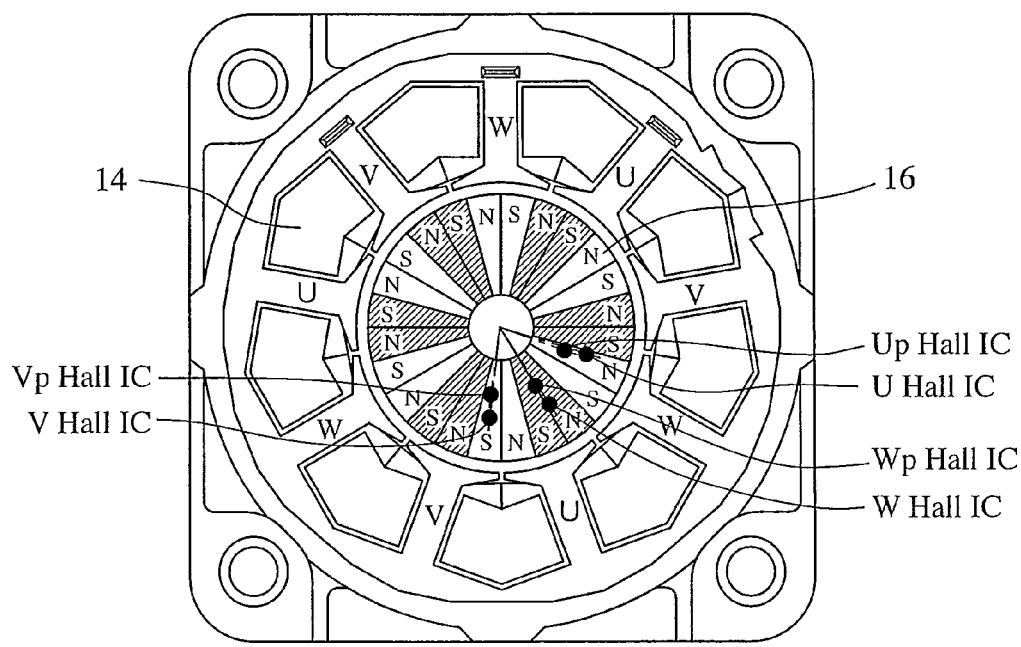
 Shows N Pole of Rotor 12

FIG. 4  PRIOR ART

| Number of Poles of Rotor | Number of Poles of Magnet | Mechanical Angle $\theta 1$ (Electrical Angle of 360 Degrees) | Minimum Angle for Hall IC Installation $\theta 1/3$ | Normal Angle for Hall IC Installation |
|---|---|---|---|---|
| 12 Poles | 12 Poles | $\theta 1=60°$ | 20° $\begin{cases} \theta_{u0}=0 \\ \theta_{v0}=80 \\ \theta_{w0}=140 \end{cases}$ | $\begin{cases} \theta_{un}=\theta_{u0}+60n \\ \theta_{vn}=\theta_{v0}+60n \\ \theta_{wn}=\theta_{w0}+60n \end{cases}$ |
| 12 Poles | 24 Poles | $\theta 1=30°$ | 10° $\begin{cases} \theta_{u0}=0 \\ \theta_{v0}=10 \\ \theta_{w0}=40 \end{cases}$ | $\begin{cases} \theta_{un}=\theta_{u0}+30n \\ \theta_{vn}=\theta_{v0}+30n \\ \theta_{wn}=\theta_{w0}+30n \end{cases}$ |
| | Single Precision | | | |
| | Double Precision | | | |

FIG. 7   PRIOR ART (a) Single Precision (12-Pole Magnet)

| | Hall IC Outputs | | | Electrical Angle | Mechanical Angle | Energizing Direction | |
|---|---|---|---|---|---|---|---|
| | U | V | W | Degrees | Degrees | Opening Direction | Closing Direction |
| (1) | H | L | H | 0 | 0 | V→U | U→V |
| (2) | H | L | L | 60 | 20 | W→U | U→W |
| (3) | H | H | L | 120 | 40 | W→V | V→W |
| (4) | L | H | L | 180 | 60 | U→V | V→U |
| (5) | L | H | H | 240 | 80 | U→W | W→U |
| (6) | L | L | H | 300 | 100 | V→W | W→V |

(b) Double Precision (24-Pole Magnet)

| | Hall IC Outputs | | | Electrical Angle | Mechanical Angle | Energizing Direction | |
|---|---|---|---|---|---|---|---|
| | U | V | W | Degrees | Degrees | Opening Direction | Closing Direction |
| (1) | H | L | H | 0 | 0 | V→U | U→V |
| (2) | H | L | L | 30 | 5 | | |
| (3) | H | H | L | 60 | 10 | W→U | U→W |
| (4) | L | H | L | 90 | 15 | | |
| (5) | L | H | H | 120 | 20 | W→V | V→W |
| (6) | L | L | H | 150 | 25 | | |
| (7) | H | L | H | 180 | 30 | U→V | V→U |
| (8) | H | L | L | 210 | 35 | | |
| (9) | H | H | L | 240 | 40 | U→W | W→U |
| (10) | L | H | L | 270 | 45 | | |
| (11) | L | H | H | 300 | 50 | V→W | W→V |
| (12) | L | L | H | 330 | 55 | | |

☐ Shows Switching

FIG. 8

Quadruple Precision (24-Pole Magnet)

| | | Main Hall IC Outputs | | | Sub Hall IC Outputs | | | Electrical Angle | Mechanical Angle | Energizing Direction | |
|---|---|---|---|---|---|---|---|---|---|---|---|
| | | U | V | W | U | V | W | Degrees | Degrees | Opening Direction | Closing Direction |
| A | (1) | [H] | L | H | L | L | H | 0 | 0 | V→U | U→V |
| | (2) | | | | [H] | L | H | 15 | 2.5 | | |
| | (3) | H | L | [L] | | | | 30 | 5 | | |
| | (4) | | | | H | L | [L] | 45 | 7.5 | | |
| | (5) | H | [H] | L | | | | 60 | 10 | W→U | U→W |
| | (6) | | | | H | [H] | L | 75 | 12.5 | | |
| | (7) | [L] | H | L | | | | 90 | 15 | | |
| | (8) | | | | [L] | H | L | 105 | 17.5 | | |
| | (9) | L | H | [H] | | | | 120 | 20 | W→V | V→W |
| | (10) | | | | L | H | [H] | 135 | 22.5 | | |
| | (11) | L | [L] | H | | | | 150 | 25 | | |
| | (12) | | | | L | [L] | H | 165 | 27.5 | | |
| B | (13) | [H] | L | H | L | L | H | 180 | 30 | U→V | V→U |
| | (14) | | | | [H] | L | H | 195 | 32.5 | | |
| | (15) | H | L | [L] | | | | 210 | 35 | | |
| | (16) | | | | H | L | [L] | 225 | 37.5 | | |
| | (17) | H | [H] | L | | | | 240 | 40 | U→W | W→U |
| | (18) | | | | H | [H] | L | 255 | 42.5 | | |
| | (19) | [L] | H | L | | | | 270 | 45 | | |
| | (20) | | | | [L] | H | L | 285 | 47.5 | | |
| | (21) | L | H | [H] | | | | 300 | 50 | V→W | W→V |
| | (22) | | | | L | H | [H] | 315 | 52.5 | | |
| | (23) | L | [L] | H | | | | 330 | 55 | | |
| | (24) | | | | L | [L] | H | 345 | 57.5 | | |

☐ Shows Switching

FIG. 10

(13) Energization:
U Phase→V Phase

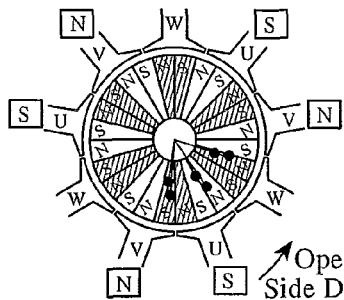

↗ Opening Side Direction

(14) Energization:
U Phase→V Phase

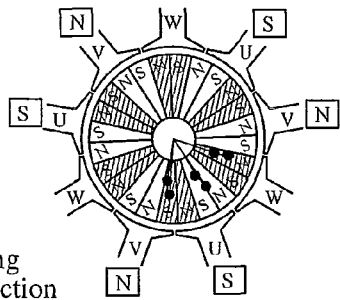

(15) Energization:
U Phase→V Phase

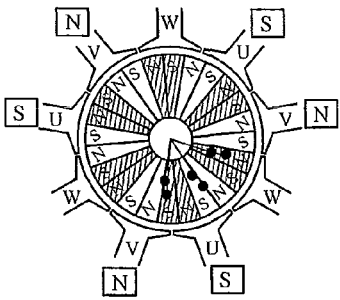

(16) Energization:
U Phase→V Phase

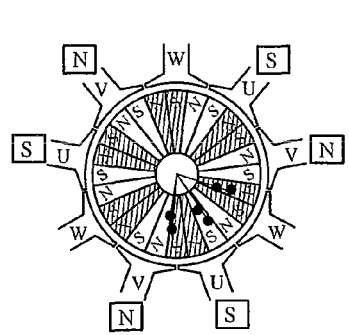

(17) Energization:
U Phase→W Phase

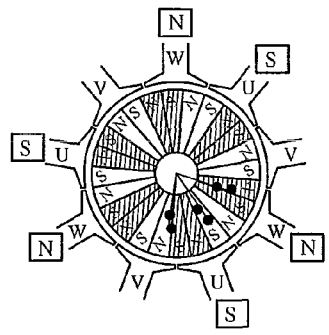

(18) Energization:
U Phase→W Phase

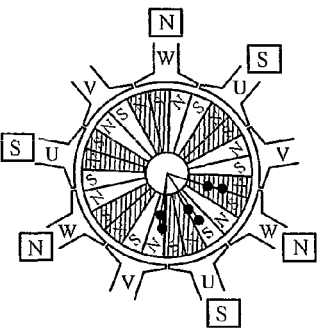

(19) Energization:
U Phase→W Phase

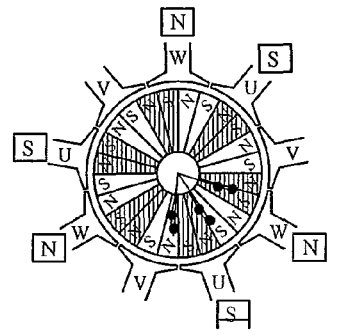

(20) Energization:
U Phase→W Phase

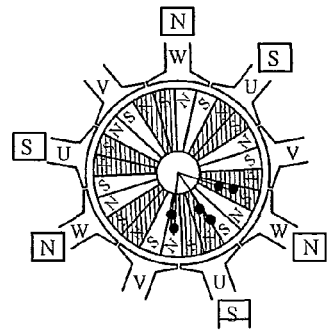

(21) Energization:
V Phase→W Phase

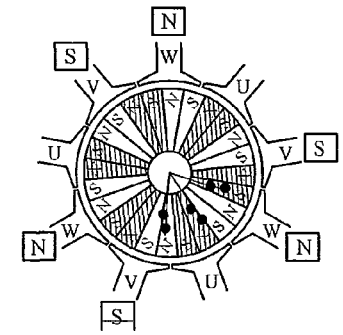

(22) Energization:
V Phase→W Phase

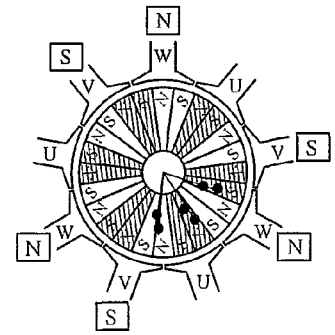

(23) Energization:
V Phase→W Phase

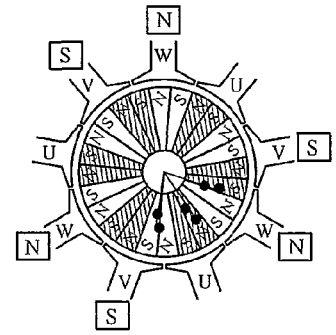

(24) Energization:
V Phase→W Phase

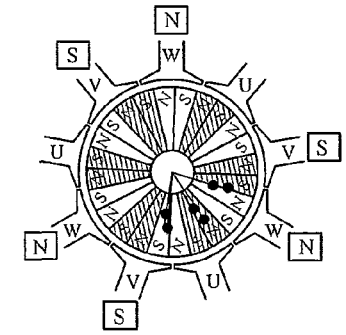

FIG. 11

(24) Energization:
W Phase→V Phase

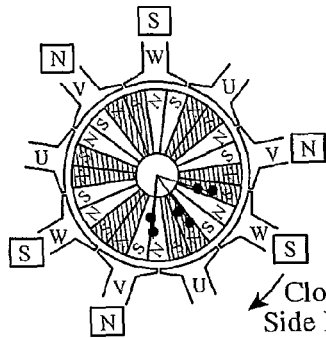

↙Closing Side Direction

(23) Energization:
W Phase→V Phase

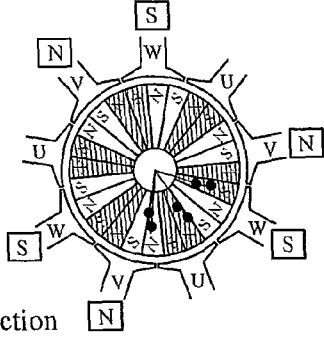

(22) Energization:
W Phase→V Phase

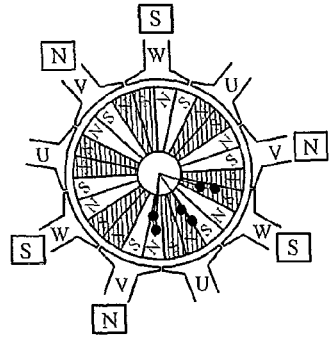

(21) Energization:
W Phase→V Phase

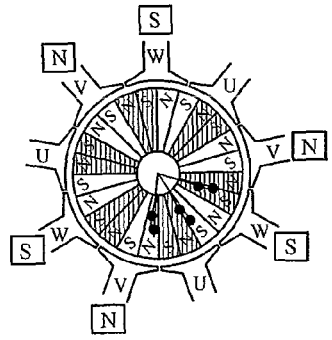

(20) Energization:
W Phase→U Phase

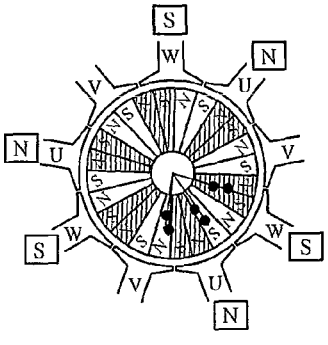

(19) Energization:
W Phase→U Phase

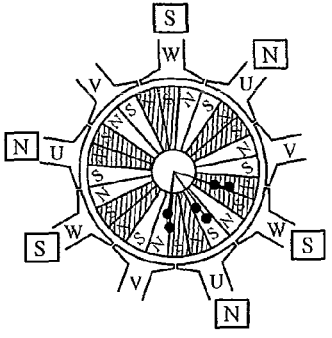

(18) Energization:
W Phase→U Phase

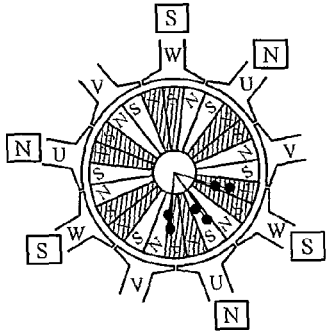

(17) Energization:
W Phase→U Phase

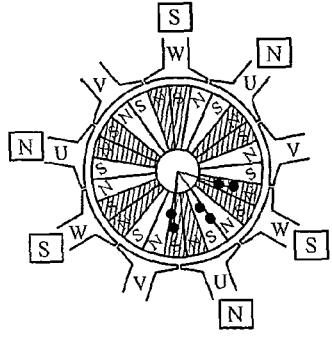

(16) Energization:
V Phase→U Phase

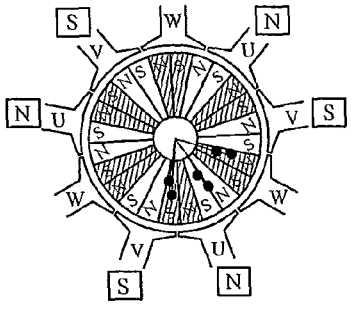

(15) Energization:
V Phase→U Phase

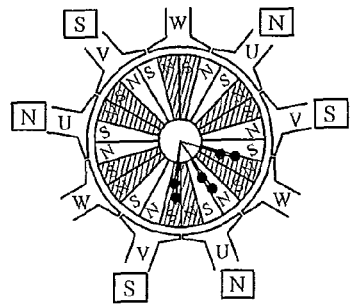

(14) Energization:
V Phase→U Phase

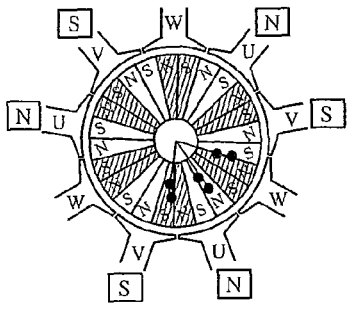

(13) Energization:
V Phase→U Phase

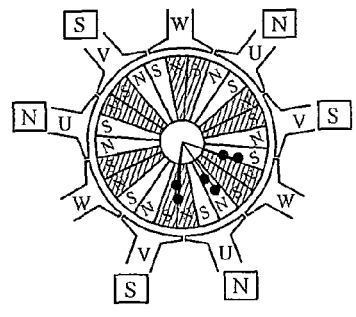

FIG. 19

(a) Double Precision (12-Pole Magnet and Six Hall ICs)

| | Main Hall IC Outputs | | | Sub Hall IC Outputs | | | Electrical Angle | Mechanical Angle | Energizing Direction | |
|---|---|---|---|---|---|---|---|---|---|---|
| | U | V | W | U | V | W | Degrees | Degrees | Opening Direction | Closing Direction |
| (1) | H | L | H | L | L | H | 0 | 0 | V→U | U→V |
| | | | | H | L | H | 30 | 5 | | |
| (2) | H | L | L | H | L | H | 60 | 10 | W→U | U→W |
| | | | | H | L | L | 90 | 15 | | |
| (3) | H | H | L | H | L | L | 120 | 20 | W→V | V→W |
| | | | | H | H | L | 150 | 25 | | |
| (4) | L | H | L | H | H | L | 180 | 30 | U→V | V→U |
| | | | | L | H | L | 210 | 35 | | |
| (5) | L | H | H | L | H | L | 240 | 40 | U→W | W→U |
| | | | | L | H | H | 270 | 45 | | |
| (6) | L | L | H | L | H | H | 300 | 50 | V→W | W→V |
| | | | | L | L | H | 330 | 55 | | |

(b) Single Precision (12-Pole Magnet and Three Hall ICs)

| | Hall IC Outputs | | | Electrical Angle | Mechanical Angle | Energizing Direction | |
|---|---|---|---|---|---|---|---|
| | U | V | W | Degrees | Degrees | Opening Direction | Closing Direction |
| (1) | H | L | H | 0 | 0 | V→U | U→V |
| (2) | H | L | L | 60 | 10 | W→U | U→W |
| (3) | H | H | L | 120 | 20 | W→V | V→W |
| (4) | L | H | L | 180 | 30 | U→V | V→U |
| (5) | L | H | H | 240 | 40 | U→W | W→U |
| (6) | L | L | H | 300 | 50 | V→W | W→V |

BRUSHLESS MOTOR DEVICE

FIELD OF THE INVENTION

The present invention relates to a brushless motor device that operates from a direct current. More particularly, it relates to a technology of improving the resolution of detection of the rotational position of a rotor.

BACKGROUND OF THE INVENTION

Conventionally, a brushless motor device is used as a driving source for driving an actuator for exhaust gas control, such as an EGR (Exhaust Gas Recirculation: exhaust gas recirculation) valve used for, for example, a vehicle, and a VG (Variable Geometvic) turbo actuator. This brushless motor device is provided with, for example, a stator whose slot number is "9", a rotor whose pole number is "8", a magnet for magnetic pole position detection whose pole number is 8 which is the same as that of the rotor, and three Hall ICs (ICs in each of which a Hall element is incorporated) for detecting the rotational position of the rotor by detecting the magnetism of this magnet for magnetic pole position detection. Such the brushless motor device in which the number of poles of the rotor is the same as that of the magnet for magnetic pole position detection and the three Hall ICs are included is referred to as a "single-precision brushless motor device" in this specification.

In recent years, a brushless motor device having a magnet for magnetic pole position detection whose pole number is increased up to "16" which is twice as many as the conventional number of poles in order to improve the resolution of detection of the rotational position of the rotor has been developed (for example, refer to patent reference 1). Such the brushless motor device in which the number of poles of the rotor is twice as many as that of the magnet for magnetic pole position detection and three Hall ICs are included is referred to as a "double-precision brushless motor device" in this specification. This double-precision brushless motor device can improve its resolution of detection of the rotational position of the rotor to twice as high as that of the single-precision brushless motor device.

[Patent reference 1] JP, 2002-252958, A

By the way, although the double-precision brushless motor device disclosed by above-mentioned patent reference 1 can detect the rotational position of the rotor with a fixed resolution, development of a brushless motor device which can detect the rotational position of a rotor with a finer resolution has been desired for, for example, an actuator for exhaust gas control and so on.

The present invention is made in order to meet the above-mentioned request, and it is therefore an object of the present invention is to provide a brushless motor device that can improve the resolution of detection of the rotational position of a rotor.

DISCLOSURE OF THE INVENTION

In order to solve the above-mentioned problem, a brushless motor device in accordance with the present invention includes a stator placed at a fixed position; a rotor which rotates when the stator is excited sequentially according to a plurality of excitation patterns, the rotor having a predetermined number of poles; a magnet for magnetic pole position detection fixed to a face perpendicular to a rotation axis of the rotor, the magnet having a number of poles which is twice as many as that of the rotor; n main Hall elements arranged opposite to the magnet for magnetic pole position detection, for detecting a magnetic pole position of the rotor; n sub Hall elements arranged opposite to the magnet for magnetic pole position detection in such a way as to have a predetermined offset in a direction of a periphery with respect to the main Hall elements, for detecting the magnetic pole position of the rotor; a main counting unit for counting "2" according to a change in an output pattern of the main Hall elements; a sub counting unit for counting "1" in a case in which the output pattern of the main Hall elements is the same as an output pattern of the sub Hall elements at a predetermined timing; and a control unit for controlling a rotation of the rotor according to the value counted by the main counting unit and the value counted by the sub counting unit.

The n-phase brushless motor device in accordance with the present invention is constructed in such a way as to include the magnet for magnetic pole position detection whose number of poles is twice as many as that of the rotor, and further include the n sub Hall elements in addition to the n main Hall ICs elements so as to detect the magnetic pole position. Therefore, the brushless motor device can increase the resolution of rotational position detection of the rotor to twice that of a conventional double-precision brushless motor device. As a result, because the brushless motor device can be implemented as a quadruple-precision brushless motor device, the resolution of rotational position detection of the rotor can be further improved as compared with the conventional brushless motor device.

BRIEF DESCRIPTION OF THE FIGURES

FIG. 2 is a view showing a valve lifting amount-Hall IC count number characteristic of the brushless motor device in accordance with Embodiment 1 of the present invention;

FIG. 3 is a plan view of the brushless motor device in accordance with Embodiment 1 of the present invention when viewed from a motor shaft end face of the brushless motor device;

FIG. 4 is a view showing an example of arrangement of Hall ICs in each of a conventional single-precision brushless motor device using a rotor 12 having 12 poles and a conventional double-precision brushless motor device using a rotor 12 having 12 poles;

FIG. 7 is a view showing a relation among an energizing direction, an electrical angle, a mechanical angle, and Hall IC outputs, the relation being defined for operating a conventional brushless motor device;

FIG. 8 is a view showing a relation among the energizing direction, the electrical angle, the mechanical angle, and the Hall IC outputs, the relation being defined for operating the brushless motor device in accordance with Embodiment 1 of the present invention;

FIG. 10 is a view (second half) showing the energization sequence at the time when the rotor rotates in the opening direction, and the torque point of the rotor in each energization in the brushless motor device in accordance with Embodiment 1 of the present invention;

FIG. 11 is a view (first half) showing energization sequence at a time when the rotor rotates in a closing direction, and the torque point of the rotor in each energization in the brushless motor device in accordance with Embodiment 1 of the present invention;

FIG. 19 is a view showing a relation among the energizing direction, the electrical angle, the mechanical angle, and the Hall IC outputs, the relation being defined for operating the brushless motor device in accordance with Embodiment 2 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
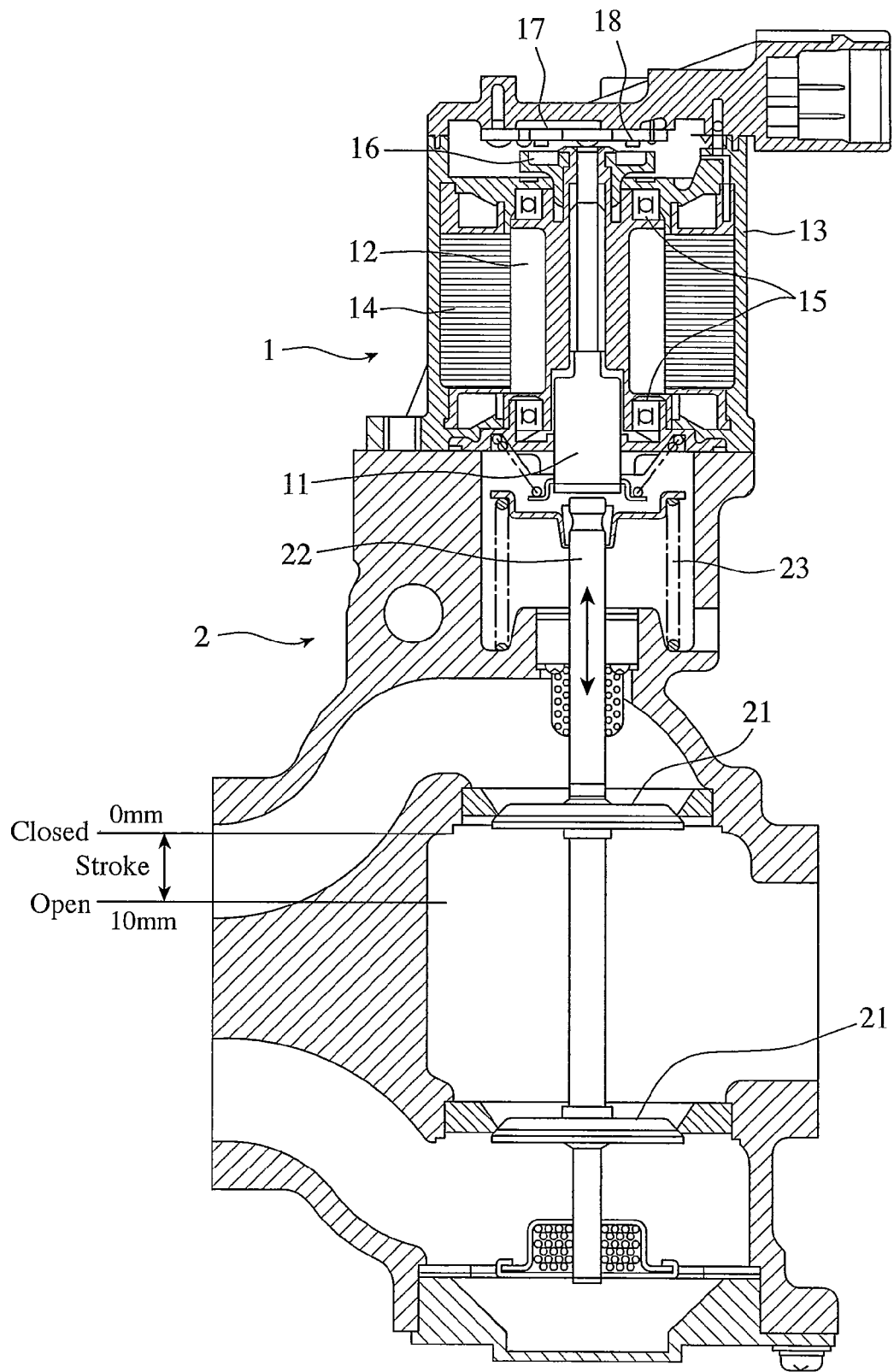
FIG. 1 is a cross-sectional view, taken along an axis direction, showing the structure of an EGR valve to which a brushless motor device in accordance with Embodiment 1 of the present invention is applied.

FIG. 1 is a cross-sectional view, taken along an axis direction, showing the structure of an EGR valve to which a brushless motor device in accordance with Embodiment 1 of the present invention is applied. This EGR valve is roughly divided into a brushless motor device 1 and a valve mechanism 2.

The brushless motor device 1 is constructed in such a way that a cylindrical rotor 12 screwed onto a motor shaft 11 is inserted into a hollow portion of a stator 14 fixed to a case 13 and is rotatably supported by bearings 15. Furthermore, a magnet 16 for magnetic pole position detection is fixed to the rotor 12 in such a way as to form a face perpendicular to the axis of the rotor 12.

Hall ICs 18 are mounted on a printed circuit board 17. Each Hall IC 18 is constructed of an IC in which an Hall element is incorporated. The printed circuit board 17 is attached to the case 13 in such a way that the Hall ICs 18 are arranged opposite to the magnet 16 for magnetic pole position detection. The motor shaft 11 screwed into the rotor 12 can be made to move in a direction of the axis thereof (in an upward or downward direction shown in FIG. 1) by rotation of the rotor 12, and a screw thread is formed in each of the motor shaft 11 and the rotor 12 in such a way that the amount of travel of the motor shaft 11 per one revolution of the rotor 12 is 8 mm.

A valve shaft 22 to which the valve 21 is fixed is disposed in the valve mechanism 2, and the axis of the valve shaft 22 is placed in such a way as to align with the axis of the motor shaft 11. This valve shaft 22 is pressed toward a direction in which the valve 21 is closed (referred to as a "valve closing direction" from here on) by a return spring 23 in order to implement a fail safe function. The valve shaft 22 can be made to move in a direction of the axis thereof (in a direction shown by an arrow in the figure) by an end thereof being in contact with the motor shaft 11. This valve shaft 22 has a stroke of 10 mm, and when the valve 21 is closed, the valve shaft 22 is placed at a position of 0 mm, whereas when the valve 21 is open, the valve shaft 22 is placed at a position of 10 mm.

FIG. 2 shows a valve lifting amount-Hall IC count number characteristic. A valve lifting amount showing the amount of travel of the valve 21, and is proportional to a Hall IC count number showing the number of times that the output pattern of the Hall ICs 18 has varied. The valve lifting amount is defined in such a way as to reach 10 mm which is a maximum valve lifting amount when the Hall IC count number reaches 240 in a case in which the Hall IC count number is set to 0 immediately after the motor shaft 11 comes into contact with the valve shaft 22, that is, in a state in which the valve lifting amount is 0 mm. Therefore, one increment of the Hall IC count number corresponds to an increase of 0.0416 mm in the valve lifting amount.

FIG. 3 is a plan view of the brushless motor device 1 when viewed from the motor shaft end face of the brushless motor device 1. The number of slots of the stator 14 of this brushless motor device 1 is "9", the number of poles of the rotor 12 is "12", and the number of poles of the magnet 16 for magnetic pole position detection is "24". The magnet 16 for magnetic pole position detection is constructed in such a way that each pair of an N pole and an S pole corresponds to a pole of the rotor 12. In FIG. 3, each pair of an N pole and a S pole which are diagonally shaded corresponds to an N pole of the rotor 12, and each pair of an N pole and an S pole which is not diagonally shaded corresponds to an S pole of the rotor 12.

The Hall ICs 18 which are arranged opposite to the magnet 16 for magnetic pole position detection are comprised of six Hall ICs including a U Hall IC, a V Hall IC, a W Hall IC, a Up Hall IC, a Vp Hall IC, and a Wp Hall IC, as shown in FIG. 3.

FIG. 4 is a view showing an example of arrangement of Hall ICs in each of a conventional single-precision brushless motor device using a rotor 12 having 12 poles and a conventional double-precision brushless motor device using a rotor 12 having 12 poles for comparison with the brushless motor device in accordance with this Embodiment 1. In the case of the single-precision brushless motor device, a magnet for magnetic pole position detection having 12 poles and three Hall ICs are used. In this case, a U Hall IC, a V Hall IC, and a W Hall IC which respectively correspond to the U phase, the V phase, and the W phase are arranged at intervals of an equiangular distance (an electrical angle of 120 degrees) in a pair of an N pole and an S pole (an electrical angle of 360 degrees), and three states exist in the cycle of a pair of an N pole and an S pole (a mechanical angle of 60 degrees or an electrical angle of 360 degrees).

Similarly, in the case of the double-precision brushless motor device, a magnet for magnetic pole position detection having 24 poles and three Hall ICs are used. In this case, a U Hall IC, a V Hall IC, and a W Hall IC which respectively correspond to the U phase, the V phase, and the W phase are arranged at intervals of an equiangular distance (an electrical angle of 120 degrees) in a pair of an N pole and an S pole (an electrical angle of 360 degrees), and three states exist in the cycle of a pair of an N pole and an S pole (a mechanical angle of 30 degrees or an electrical angle of 360 degrees). In either of these single-precision and double-precision cases, the Hall ICs play the role of the brush of a DC motor.

Figure 5:
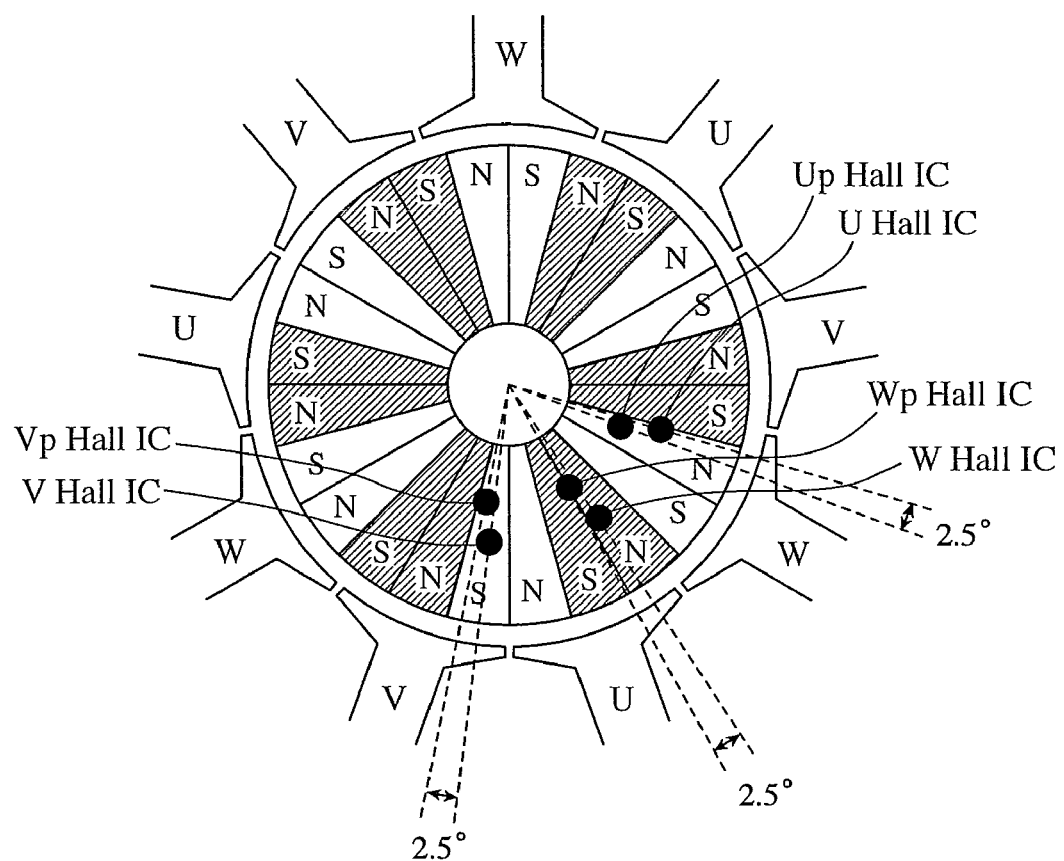
FIG. 5 is a view showing an example of arrangement of Hall ICs in the quadruple-precision brushless motor device of in accordance with Embodiment 1 of the present invention.

FIG. 5 is a view showing an example of arrangement of the Hall ICs 18 in the quadruple-precision brushless motor device in accordance with Embodiment 1 of the present invention. In this case, the six Hall ICs are used. The Up Hall IC, the Vp Hall IC, and the Wp Hall IC (collectively referred to as the "sub Hall ICs 18$b$" from here on) are arranged at positions which are shifted respectively by a predetermined offset from the positions of the U Hall IC, the V Hall IC, and the W Hall IC (collectively referred to as the "main Hall ICs 18$a$" from here on), which are respectively the same as those placed in the double-precision brushless motor device shown in FIG. 4. The offset is one-twelfth of the angle (a mechanical angle of 30 degrees or an electrical angle of 360 degrees) of each pair of an N pole and an S pole which constructs the magnet 16 for magnetic pole position detection, and is equal to a mechanical angle of 2.5 degrees (or an electrical angle of 15 degrees). The main Hall ICs 18$a$ correspond to main Hall elements of the present invention, and the sub Hall ICs 18$b$ correspond to sub Hall elements of the present invention.

Figure 6:
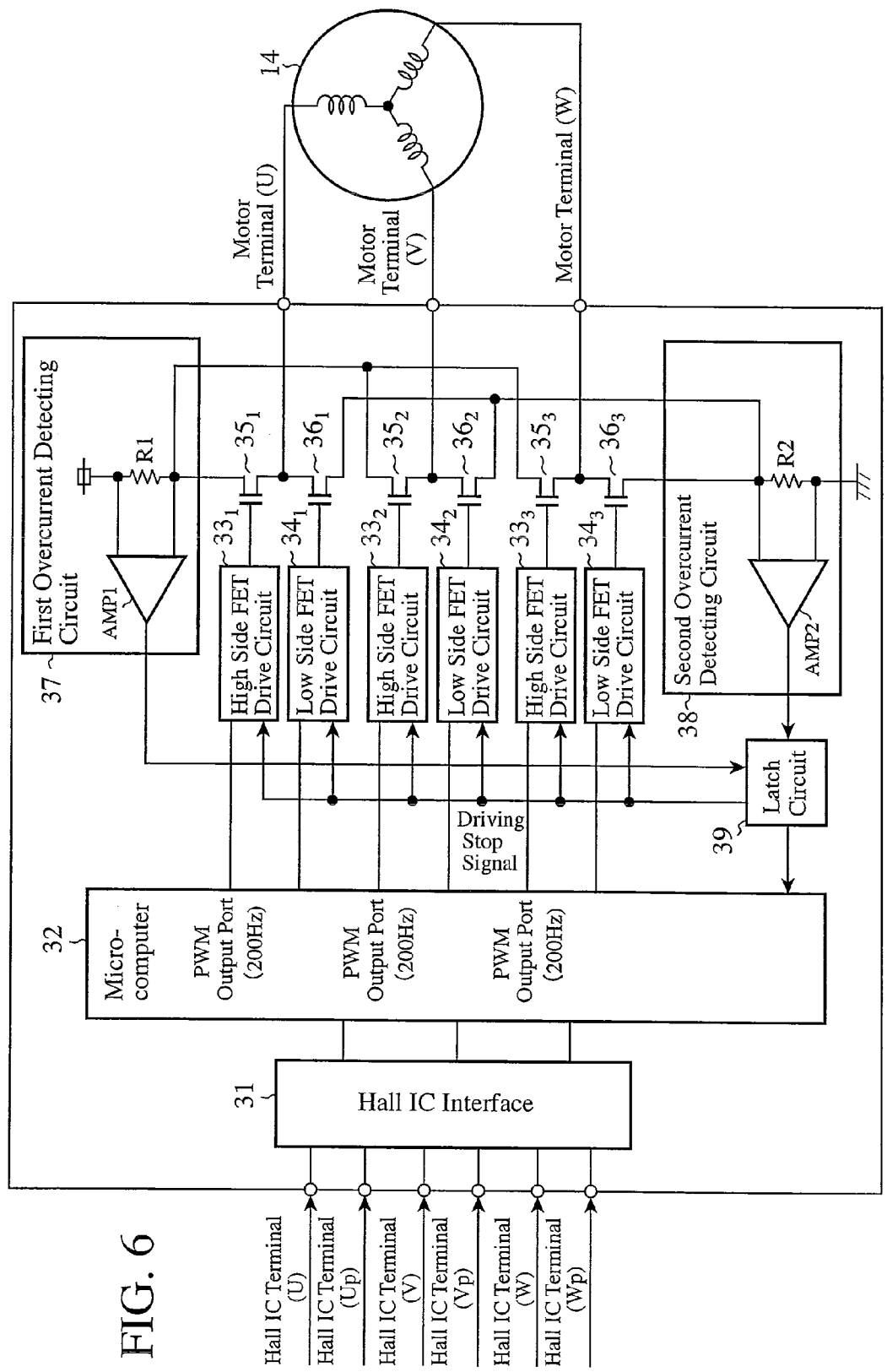
FIG. 6 is a block diagram showing the structure of a motor drive circuit for use in the brushless motor device in accordance with Embodiment 1 of the present invention.

FIG. 6 is a block diagram showing the structure of a motor drive circuit for use in the brushless motor device 1. This motor drive circuit corresponds to a control unit of the present invention, and is mounted in, for example, a control device (not shown) disposed separately from the brushless motor device. The motor drive circuit is comprised of a Hall IC interface 31, a microcomputer (abbreviated as a "microcomputer" from here on) 32, a high side FET drive circuits $33_1$ to $33_3$, low side FET drive circuits $34_1$ to $34_3$, high side FETs $35_1$ to $35_3$, low side FETs $36_1$ to $36_3$, a first overcurrent detecting circuit 37, a second overcurrent detecting circuit 38, and a latch circuit 39.

The Hall IC interface 31 receives a signal sent thereto, via a Hall IC terminal (U), from the U Hall IC which constructs the main Hall ICs 18$a$, a signal sent thereto, via a Hall IC terminal (V), from the V Hall IC which constructs the main Hall ICs 18$a$, and a signal sent thereto, via a Hall IC terminal (W), from the W Hall IC which constructs the main Hall ICs 18$a$, and a signal sent thereto, via a Hall IC terminal (Up), from the Up Hall IC which constructs the sub Hall ICs 18$b$, a signal sent thereto, via a Hall IC terminal (Vp), from the Vp Hall IC which constructs the sub Hall ICs 18$b$, and a signal sent thereto, via a Hall IC terminal (Wp), from the Wp Hall IC which constructs the sub Hall ICs 18$b$, and, after performing a predetermined amplification and so on on these signals, sends them to the microcomputer 32.

The microcomputer 32 corresponds to a main counting unit, a sub counting unit, and a control unit of the present invention, and generates motor control signals on the basis of the signals sent from the Hall IC interface 31 and sends the motor control signals to the high side FET drive circuits $33_1$ to $33_3$ and the low side FET drive circuits $34_1$ to $34_3$ via its PWM output ports. The microcomputer 32 also stops the generation of the motor control signals when receiving a driving stop signal from the latch circuit 39.

When no driving stop signal is sent thereto from the latch circuit 39, the high side FET drive circuits $33_1$ to $33_3$ generate driving signals on the basis of the motor control signals sent thereto from the microcomputer 32, and send the driving signals to the gates of the high side FETs $35_1$ to $35_3$, respectively. The high side FETs $35_1$ to $35_3$ are turned on according to the driving signals which are sent thereto from the high side FET drive circuits $33_1$ to $33_3$ at predetermined timings, respectively, so as to send a current sent thereto from a power supply via a resistor R1 of the first overcurrent detecting circuit 37 to a coil of the stator 14 via a motor terminal (U), a motor terminal (V), or a motor terminal (W).

When no driving stop signal is sent thereto from the latch circuit 39, the low side FET drive circuits $34_1$ to $34_3$ generate driving signals on the basis of the motor control signals sent from the microcomputer 32, and send the driving signals to the gates of the low side FETs $36_1$ to $36_3$, respectively. The low side FETs $36_1$ to $36_3$ are turned on according to the driving signals which are sent thereto from the low side FET drive circuits $34_1$ to $34_3$ at predetermined timings, respectively, so as to make the current sent thereto from a coil of the stator 14 via the motor terminal (U), the motor terminal (V), or the motor terminal (W) flow into the ground via a resistor R2 of the second overcurrent detecting circuit 38.

The first overcurrent detecting circuit 37 is comprised of the resistor R1 and an operational amplifier AMP1 for detecting the voltage across this resistor R1, and, when detecting that the current flowing from the power supply, via the high side FETs $35_1$ to $35_3$, into a coil of the stator 14 has a predetermined current value or more, generates an overcurrent signal showing overcurrent, and sends this overcurrent signal to the latch circuit 39. The second overcurrent detecting circuit 38 is comprised of the resistor R2 and an operational amplifier AMP2 for detecting the voltage across this resistor R2, and, when detecting that the current flowing from a coil of the stator 14, via the low side FETs $36_1$ to $36_3$, into the ground has a predetermined current value or more, sends an overcurrent signal showing overcurrent to the latch circuit 39.

The latch circuit 39 latches the overcurrent signal sent thereto from the first overcurrent detecting circuit 37 and the overcurrent signal sent thereto from the second overcurrent detecting circuit 38, and sends each of them to the high side FET drive circuits $33_1$ to $33_3$ and the low side FET drive circuits $34_1$ to $34_3$ as the driving stop signal and also sends each of them to the microcomputer 32. As a result, the generation of the driving signals by the high side FET drive circuits $33_1$ to $33_3$ and the low side FET drive circuits $34_1$ to $34_3$ is stopped, and the generation of the motor control signals by the microcomputer 32 is stopped.

In the motor drive circuit constructed as mentioned above, when the energizing direction is V→U, the high side FET $35_2$ and the low side FET $36_1$ are turned on. As a result, the current flows through the following path: the power supply→the first overcurrent detecting circuit 37→the high side FET $35_2$→the motor terminal (V)→the coils of the stator 14→the motor terminal (U)→the low side FET $36_1$→the second overcurrent detecting circuit 38→the ground, and the coils of the stator 14 are excited. When the energizing direction is W→U, the high side FET $35_3$ and the low side FET $36_1$ are turned on. As a result, the current flows through the following path: the power supply→the first overcurrent detecting circuit 37→the high side FET $35_3$→the motor terminal (W)→the coils of the stator 14→the motor terminal (U)→the low side FET $36_1$→the second overcurrent detecting circuit 38→the ground, and the coils of the stator 14 are excited.

When the energizing direction is W→V, the high side FET $35_3$ and the low side FET $36_2$ are turned on. As a result, the current flows through the following path: the power supply→the first overcurrent detecting circuit 37→the high side FET $35_3$→the motor terminal (W)→the coils of the stator 14→the motor terminal (V)→the low side FET 36$_2$→the second overcurrent detecting circuit 38→the ground, and the coils of the stator 14 are excited. When the energizing direction is U→V, the high side FET 35$_1$ and the low side FET 36$_2$ are turned on. As a result, the current flows through the following path: the power supply→the first overcurrent detecting circuit 37→the high side FET 35$_1$→the motor terminal (U)→the coils of the stator 14→the motor terminal (V)→the low side FET 36$_2$→the second overcurrent detecting circuit 38→the ground, and the coils of the stator 14 are excited.

When the energizing direction is U→W, the high side FET 35$_1$ and the low side FET 36$_3$ are turned on. As a result, the current flows through the following path: the power supply→the first overcurrent detecting circuit 37→the high side FET 35$_1$→the motor terminal (U)→the coils of the stator 14→the motor terminal (W)→the low side FET 36$_3$→the second overcurrent detecting circuit 38→the ground, and the coil of the stator 14 is excited. When the energizing direction is V→W, the high side FET 35$_2$ and the low side FET 36$_3$ are turned on. As a result, the current flows through the following path: the power supply→the first overcurrent detecting circuit 37→the high side FET 35$_2$→the motor terminal (V)→the coil of the stator 14 the motor terminal (W)→the low side FET 36$_3$→the second overcurrent detecting circuit 38→the ground, and the coils of the stator 14 are excited.

FIG. 7 is a view for explaining a relation among the energizing direction, the electrical angle, the mechanical angle, and the outputs of the Hall ICs when a conventional single-precision brushless motor device operates under normal conditions, and a relation among the energizing direction, the electrical angle, the mechanical angle, and the outputs of the Hall ICs when a conventional double-precision brushless motor device operates under normal conditions, in order to make a comparison with the brushless motor device in accordance with this Embodiment 1.

FIG. 7(a) is a view showing a relation among the energizing direction, the electrical angle, the mechanical angle, and the outputs of the Hall ICs when a conventional single-precision brushless motor device including a magnet for magnetic pole position detection having 12 poles operates under normal conditions. When causing a rotor 12 to rotate in a direction of opening a valve 21 (opening direction), the energization is repeated for each of the coils of the U, V, and W phases of a stator 14 in order of V→U, W→U, W→V, U→V, U→W, and V→W. In contrast, when causing the rotor 12 to rotate in a direction of closing the valve 21 (closing direction), the energization is repeated for each of the coils of the U, V, and W phases of the stator 14 in order of W→V, W→U, V→U, V→W, U→W, and U→V. These energization patterns are referred to as the "regular energization patterns", and excitation patterns for exciting the stator 14 according to these regular energization patterns are referred to as the "regular excitation patterns".

FIG. 7(b) is a view showing a relation among the energizing direction, the electrical angle, the mechanical angle, and the outputs of the Hall ICs when a conventional double-precision brushless motor device including a magnet for magnetic pole position detection having 24 poles operates under normal conditions. In the case in which the magnet for magnetic pole position detection has 24 poles, the Hall ICs have two types of their output pattern with respect to each energizing direction. Therefore, the Hall ICs yield the same output pattern for a region A in which the energizing direction in the opening direction varies in order of V→U, W→U, and W→V (the energizing direction in the closing direction varies in order of V→W, U→W, and U→V), and for a region B in which the energizing direction in the opening direction varies in order of U→V, U→W, and V→W (the energizing direction in the closing direction varies in order of W→V, W→U, and V→U).

FIG. 8 is a view for explaining a relation among the energizing direction, the electrical angle, the mechanical angle, and the outputs of the Hall ICs when the quadruple-precision brushless motor device in accordance with Embodiment 1 of the present invention including the magnet 16 for magnetic pole position detection having 24 poles operates under normal conditions. In the case in which the magnet for magnetic pole position detection has 24 poles, the Hall ICs 18 have four types of their output pattern with respect to each energizing direction. Therefore, the Hall ICs 18 yield the same output pattern for the region A in which the energizing direction in the opening direction varies in order of V→U, W→U, and W→V (the energizing direction in the closing direction varies in order of V→W, U→W, and U→V), and for the region B in which the energizing direction in the opening direction varies in order of U→V, U→W, and V→W (the energizing direction in the closing direction varies in order of W→V, W→U, and V→U).

Figure 9:
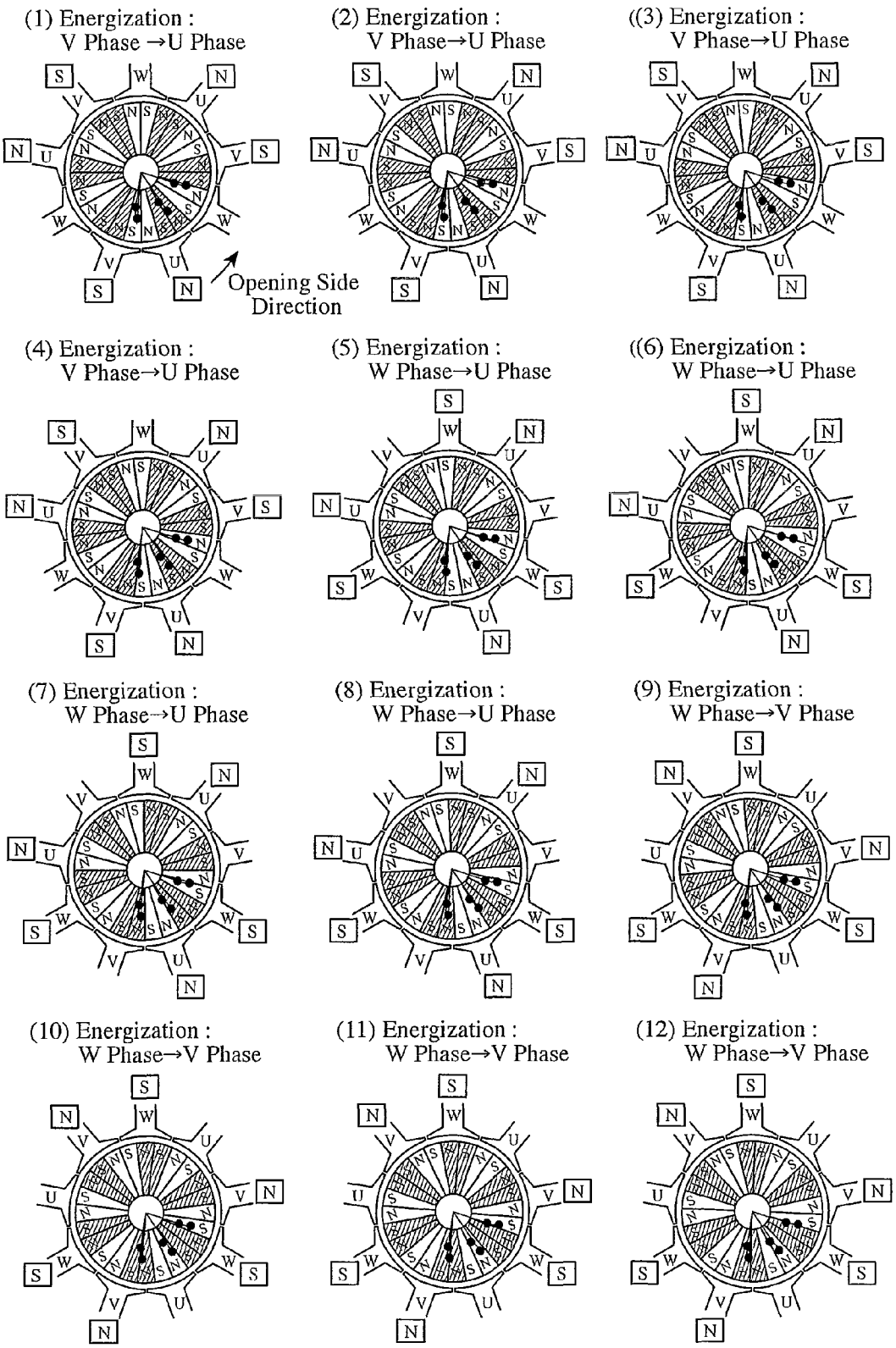
FIG. 9 is a view (first half) showing energization sequence at a time when a rotor rotates in an opening direction, and the torque point of the rotor in each energization in the brushless motor device in accordance with Embodiment 1 of the present invention.

FIG. 9 and FIG. 10 are views showing the order of the energization and the torque point of the rotor 12 in each energization in the case in which the brushless motor device causes the rotor 12 to rotate in the direction of opening the valve according to the regular energization patterns. More specifically, in order to cause the rotor 12 to move angularly in the valve opening direction, the brushless motor device has to switch among the energization patterns in order of increasing motor energization numbers (1) to (24) each shown by a number with each parenthesis shown in the figure.

Figure 12:
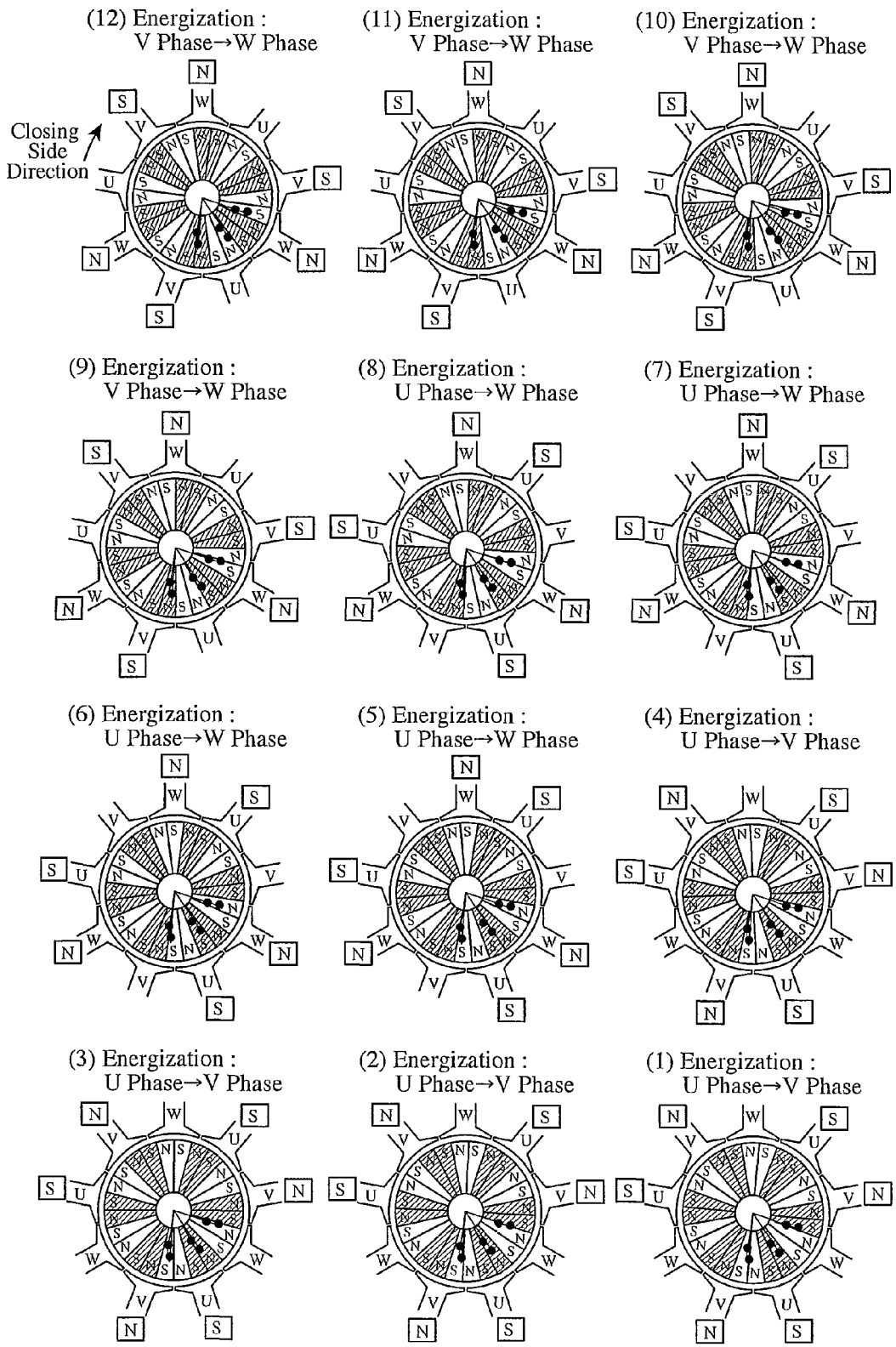
FIG. 12 is a view (second half) showing energization sequence at the time when the rotor rotates in the closing direction, and the torque point of the rotor in each energization in the brushless motor device in accordance with Embodiment 1 of the present invention.

FIG. 11 and FIG. 12 are views showing the order of energization and the torque point of the rotor 12 in each energization in the case in which the brushless motor device causes the rotor 12 to rotate in the direction of closing the valve according to the regular energization patterns. More specifically, in order to cause the rotor 12 to move angularly in the valve closing direction, the brushless motor device has to switch among the energization patterns in order of decreasing motor energization numbers (24) to (1) each shown by the number with each parenthesis shown in the figure.

Figure 13:
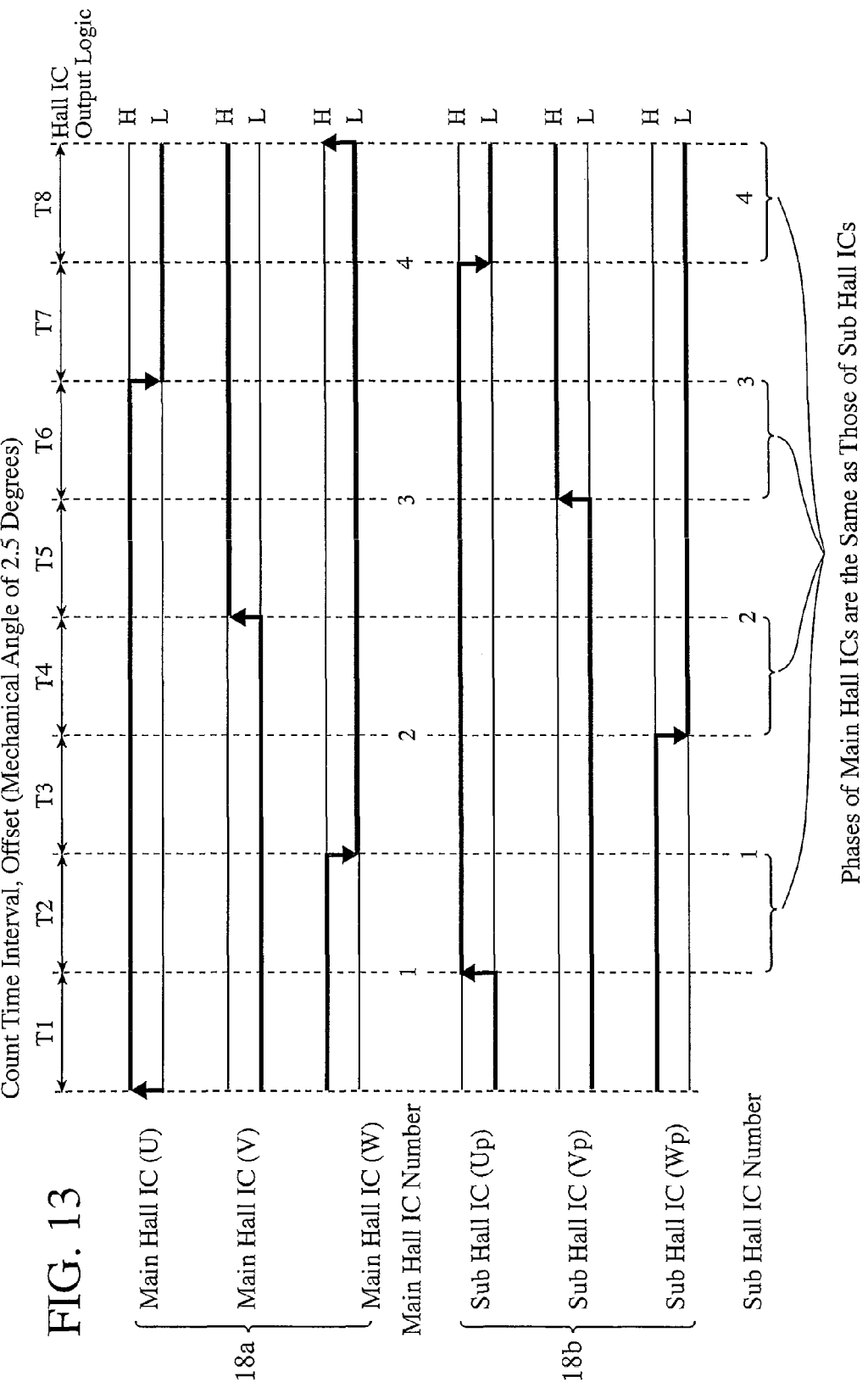
FIG. 13 is a view showing a state in which the outputs of the Hall ICs vary one by one in the brushless motor device in accordance with Embodiment 1 of the present invention.

FIG. 13 is a view showing a state in which the logical values of the signals outputted from the Hall ICs 18 (the main Hall ICs 18a and the sub Hall ICs 18b) vary one by one as the magnet 16 for magnetic pole position detection rotates integrally with the rotor 12. While each of the Hall ICs 18 corresponds to one magnetic pole (an N pole or an S pole) of the magnet 16 for magnetic pole position detection, in other words, every time when each of the Hall ICs 18 moves angularly by a mechanical angle of 15 degrees, each of the Hall ICs 18 alternately outputs a signal at a high level (H level) and a signal at a low level (L level).

Furthermore, the U Hall IC, the V Hall IC, and the W Hall IC which construct the main Hall ICs 18a output signals whose phases are shifted from one another by a mechanical angle of 5 degrees. Similarly, the Up Hall IC, the Vp Hall IC, and the Wp Hall IC which construct the sub Hall ICs 18b output signals whose phases are shifted from one another by a mechanical angle of 5 degrees. Furthermore, the phases of the signals outputted from the Up Hall IC, the Vp Hall IC, and the Wp Hall IC which construct the sub Hall ICs 18b are shifted respectively from those of the signals outputted from the U Hall IC, the V Hall IC, and the W Hall IC which construct the main Hall ICs 18a by one count time interval (i.e., a mechanical angle of 2.5 degrees). Therefore, the signals outputted from the main Hall ICs 18a have the same phases as the signals outputted from the sub Hall ICs 18b, respectively, every other count time interval.

Next, the operation of the brushless motor device in accordance with Embodiment 1 of the present invention constructed as mentioned above will be explained.

Figure 14:
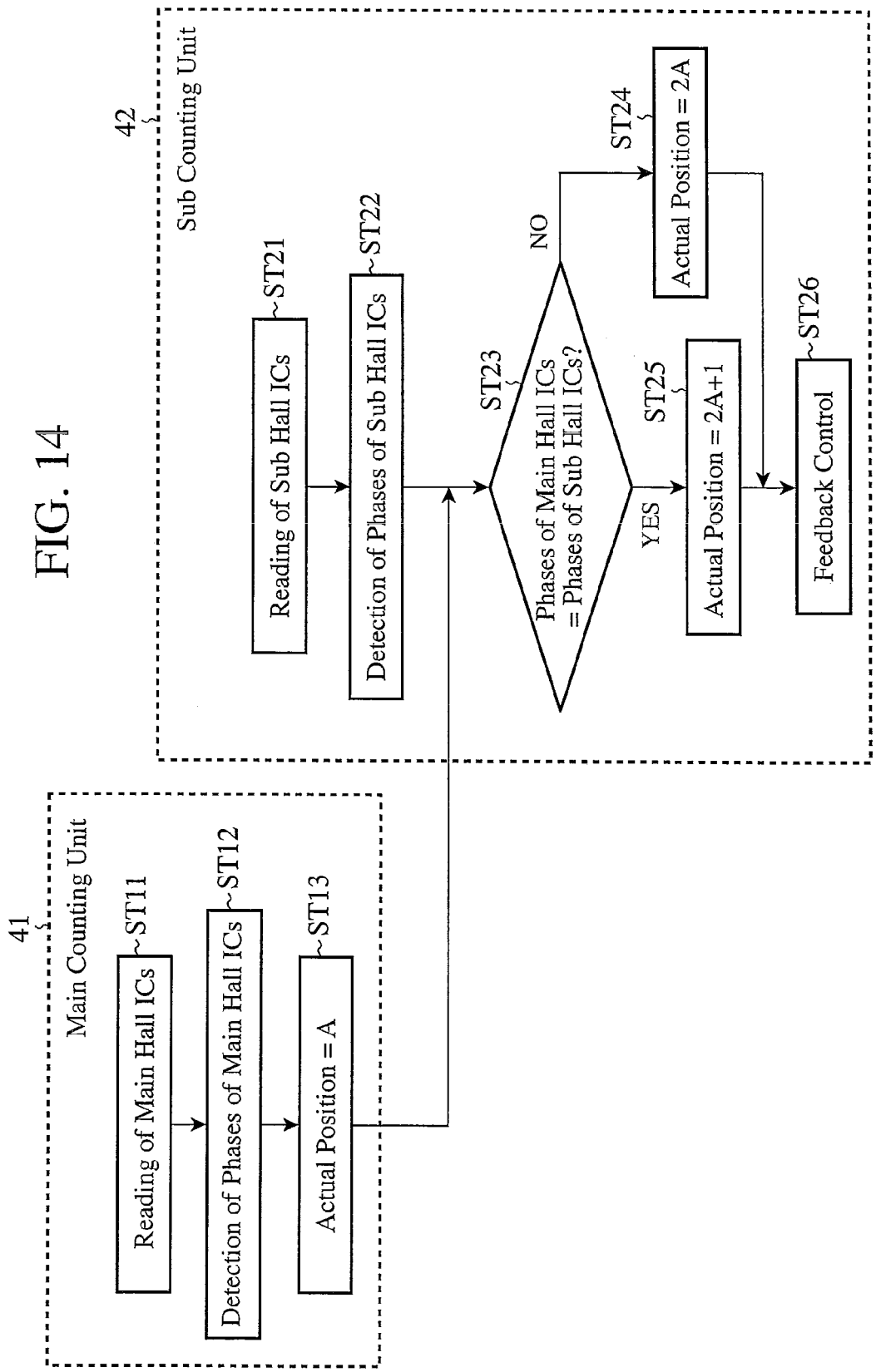
FIG. 14 is a flow chart showing the operation of the brushless motor device in accordance with Embodiment 1 of the present invention by focusing on a position control process.

FIG. 14 is a flow chart showing the operation of this brushless motor device by focusing on its position control process. This position control process is performed by the microcomputer 32 of the motor drive circuit shown in FIG. 6. When this position control process is expressed by functional blocks, the position control process can be divided into a main counting unit 41 and a sub counting unit 42.

The operation of the main counting unit 41 will be explained first. This main counting unit 41 is started when a rising edge or a falling edge of the signal outputted from either of the U Hall IC, the V Hall IC, or the W Hall IC which constructs the main Hall ICs 18a is detected. When the main counting unit 41 is started, reading of the signals from the main Hall ICs is performed (step ST11). Concretely, the microcomputer 32 reads the signals outputted from the U Hall IC, the V Hall IC, and the W Hall IC which construct the main Hall ICs 18a via the Hall IC interface 31.

The phases of the main Hall ICs are then detected (step ST12). More specifically, the microcomputer 32 detects the output pattern of the main Hall ICs from the signals read in step ST11. For example, the microcomputer acquires the output pattern which is "UVW=HLH" during a count time interval T1 shown in FIG. 13.

An actual position is then calculated (step ST13). More specifically, the actual position of the rotor 12 is calculated. The calculation of this actual position can be carried out by using the same method as that used for calculation of an actual position in a conventional double-precision brushless motor device, though the details of the calculation will be omitted hereafter. In this case, the actual position calculated in this step ST13 is expressed as "A". After that, the microcomputer branches the sequence to step ST23 of the sub counting unit 42.

Next, the operation of the sub counting unit 42 will be explained. This sub counting unit 42 is started in response to an interrupt signal which is sent from a not-shown timer at intervals of 4 ms. When the sub counting unit 42 is started, reading of the signals from the sub Hall ICs is performed first (step ST21). Concretely, the microcomputer 32 reads the signals outputted from the Up Hall IC, the Vp Hall IC, and the Wp Hall IC which construct the sub Hall ICs 18b via the Hall IC interface 31.

The phases of the sub Hall ICs are then detected (step ST22). More specifically, the microcomputer 32 detects the output pattern of the sub Hall ICs from the signals read in step ST21. For example, the microcomputer acquires the output pattern which is "UVW=HLH" during a count time period T2 shown in FIG. 13.

The brushless motor device then checks to see whether the phases of the main Hall ICs are the same as those of the sub Hall ICs, respectively (step ST23). More specifically, the microcomputer 32 checks to see whether the output pattern of the main Hall ICs 18a detected in step ST12 of the main counting unit 41 is the same as the output pattern detected in step ST22. When, in this step ST23, judging that the phases of the main Hall ICs are not the same as those of the sub Hall ICs, respectively, the microcomputer doubles the actual position calculated in step ST13 of the main counting unit 41 (step ST24). More specifically, the microcomputer 32 counts "2" and sets the actual position to "2A". After that, the microcomputer advances the sequence to step ST26.

When, in above-mentioned step ST23, judging that the phases of the main Hall ICs are the same as those of the sub Hall ICs, respectively, the microcomputer adds "1" to the actual position calculated in step ST13 of the main counting unit 41 after doubling the actual position (step ST25). More specifically, the microcomputer counts "1" and sets the actual position to "2A+1". After that, the microcomputer advances the sequence to step ST26.

In step ST26, the brushless motor device performs feedback control to cause the rotor 12 to rotate up to a target position specified by a specific value included in a not shown desired value command, though the details of the feedback control will be omitted hereafter, like a conventional double-precision brushless motor device. In this case, as the specific value, a specific value which is four times as large as that for use in a single-precision brushless motor device. After that, the brushless motor device ends the phase control process.

Figure 15:
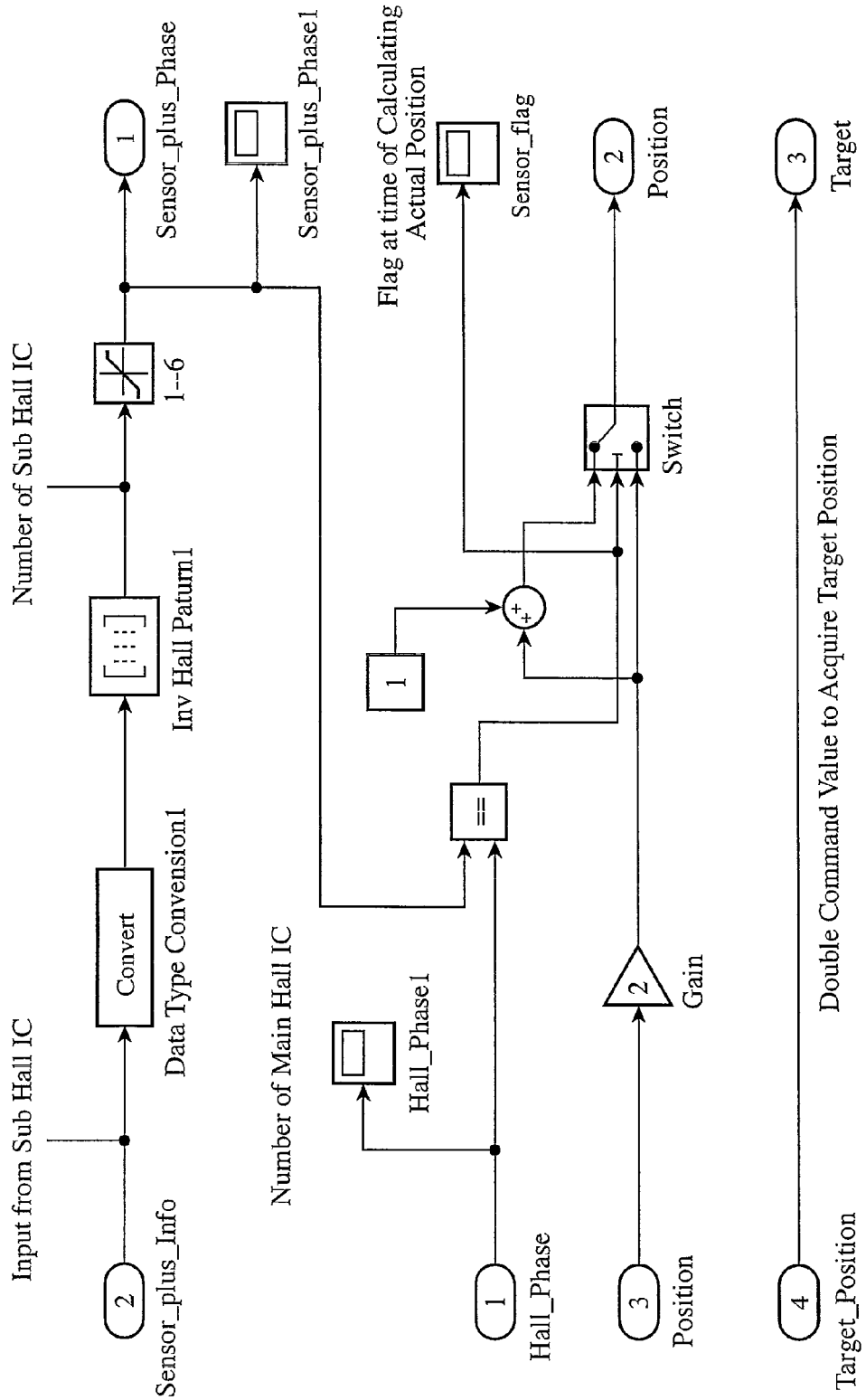
FIG. 15 is a block diagram describing the position control process shown in the flow chart of FIG. 14.

For reference purposes, FIG. 15 shows the process shown in the flow chart of FIG. 14 in the form of a block diagram.

Figure 16:
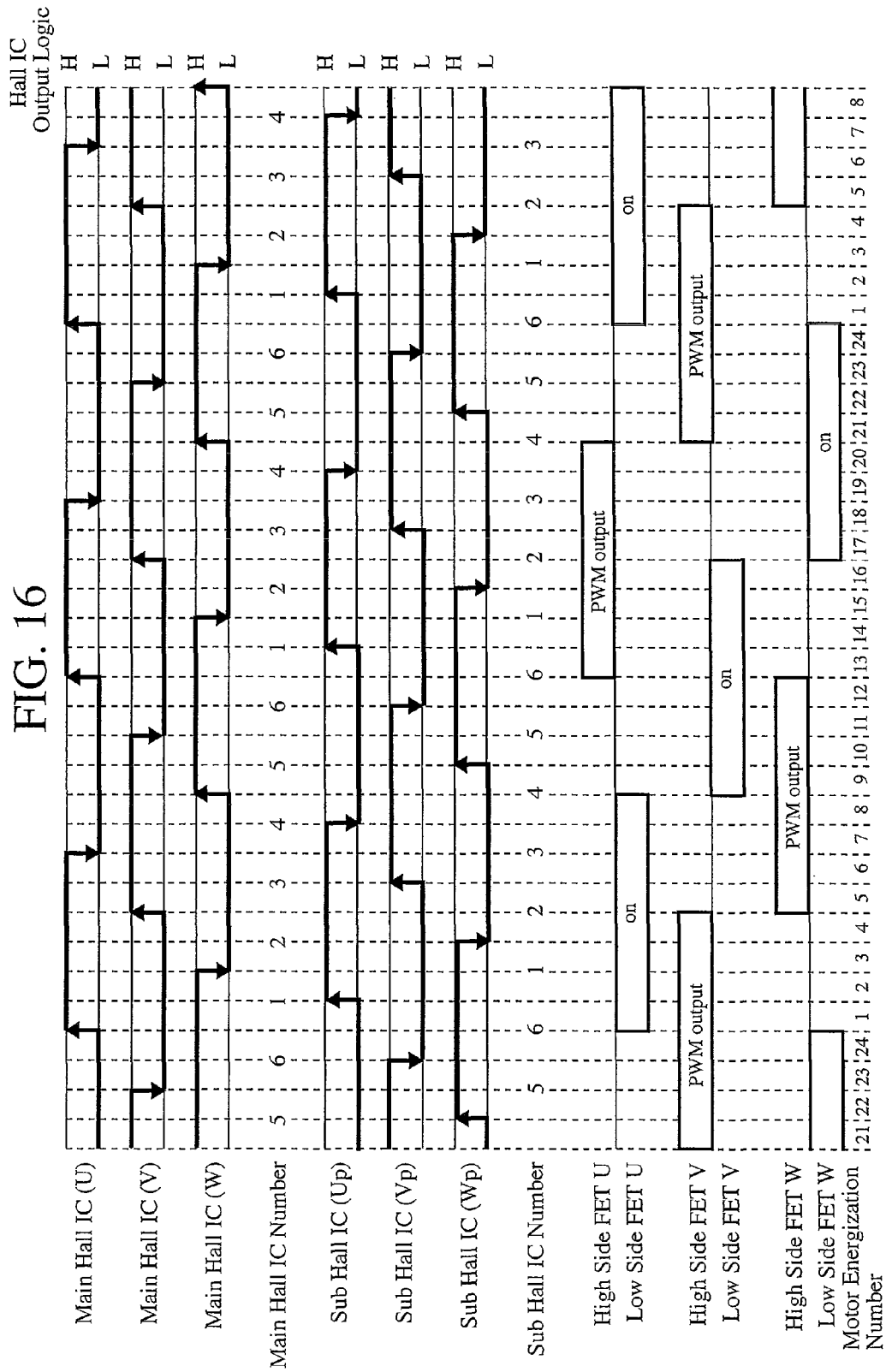
FIG. 16 is a timing chart showing an operation of causing the rotor to rotate in the direction of opening a valve in the brushless motor device in accordance with Embodiment 1 of the present invention.

FIG. 16 is a timing chart showing a relation between the energizing direction and the signals outputted from the Hall ICs 18 at the time of causing the rotor 12 to rotate in the direction of opening the valve 21. On the basis of the signals sent from the main Hall ICs 18a and the sub Hall ICs 18b, the microcomputer 32 switches on and off the high side FET $35_1$ (the high side FET U), the high side FET $35_2$ (the high side FET V), the high side FET $35_3$ (the high side FET W), the low side FET $36_1$ (the low side FET U), the low side FET $36_2$ (the low side FET V), and the low side FET $36_3$ (the low side FET W) in turn at the shown timings in increasing order of the motor energization number so as to cause the rotor 12 to rotate in the valve opening direction.

Figure 17:
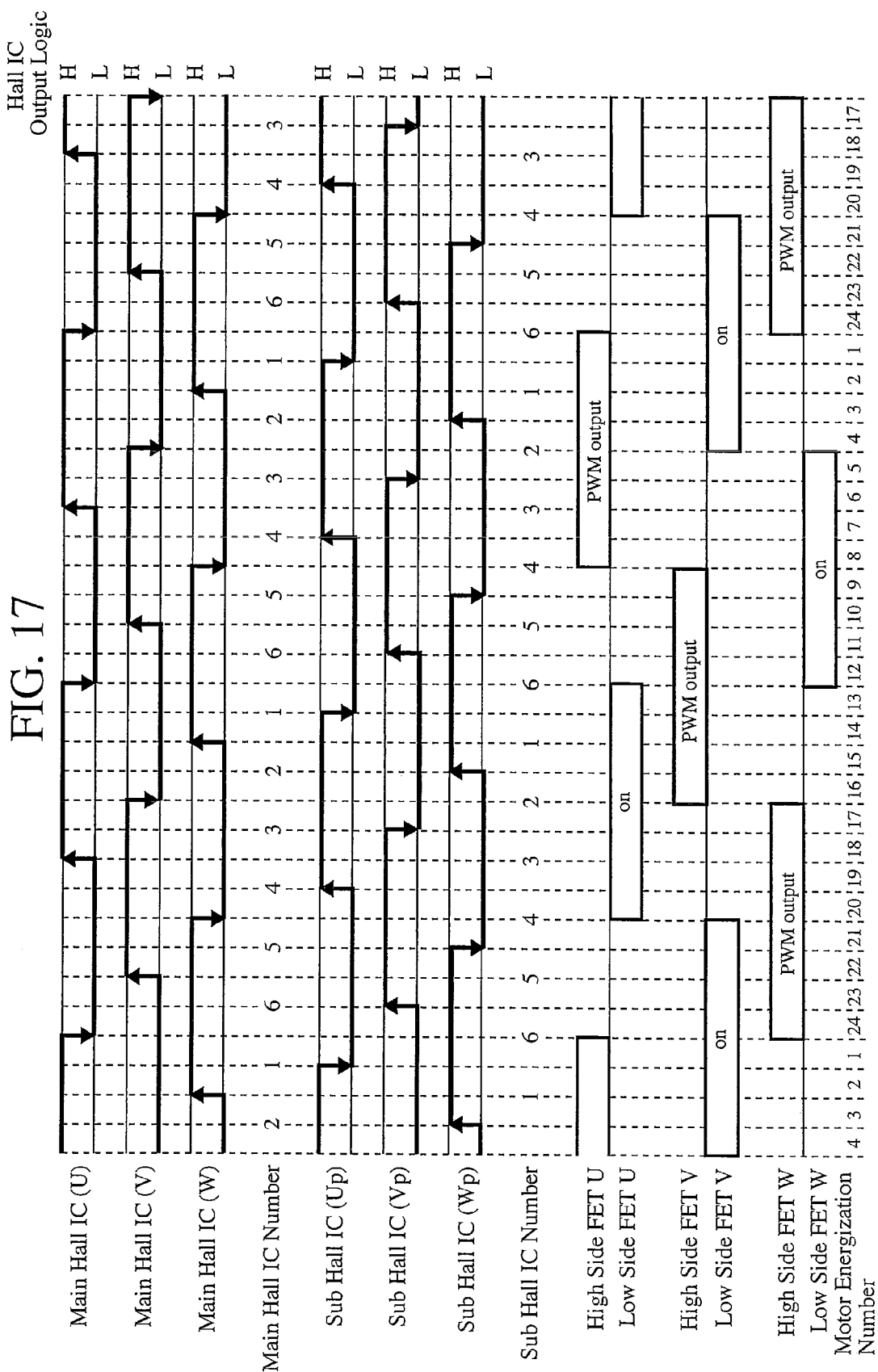
FIG. 17 is a timing chart showing an operation of causing the rotor to rotate in the direction of closing the valve in the brushless motor device in accordance with Embodiment 1 of the present invention.

FIG. 17 is a timing chart showing a relation between the energizing direction and the signals outputted from the Hall ICs 18 at the time of causing the rotor 12 to rotate in the direction of closing the valve 21. On the basis of the signals sent from the main Hall ICs 18a and the sub Hall ICs 18b, the microcomputer 32 switches on and off the high side FET $35_1$ (the high side FET U), the high side FET $35_2$ (the high side FET V), the high side FET $35_3$ (the high side FET W), the low side FET $36_1$ (the low side FET U), the low side FET $36_2$ (the low side FET V), and the low side FET $36_3$ (the low side FET W) in turn at the shown timings in decreasing order of the motor energization number so as to cause the rotor 12 to rotate in the valve closing direction.

As previously explained, the brushless motor device in accordance with Embodiment 1 of the present invention is a three-phase brushless motor device including a magnet 16 for magnetic pole position detection whose number of poles is 24 which is twice as many as the number of poles of a rotor 12, and further includes three sub Hall ICs 18b in addition to three main Hall ICs 18a so as to detect the magnetic pole position. Therefore, the brushless motor device can increase the resolution of detection of the rotational position of the rotor 12 to twice as high as that of a conventional double-precision brushless motor device. As a result, because the brushless motor device in accordance with this embodiment can be implemented as a quadruple-precision brushless motor device, the resolution of detection of the rotational position of the rotor can be further improved compared with that of the conventional double-precision brushless motor device.

Embodiment 2

A brushless motor device in accordance with Embodiment 2 of the present invention is formed as a double-precision brushless motor device that includes, as main Hall ICs, three Hall ICs which are the same as those included in a conventional single-precision brushless motor device and additionally includes three sub Hall ICs, and performs the same control as that performed by the brushless motor device in accordance with above-mentioned Embodiment 1.

Figure 18:
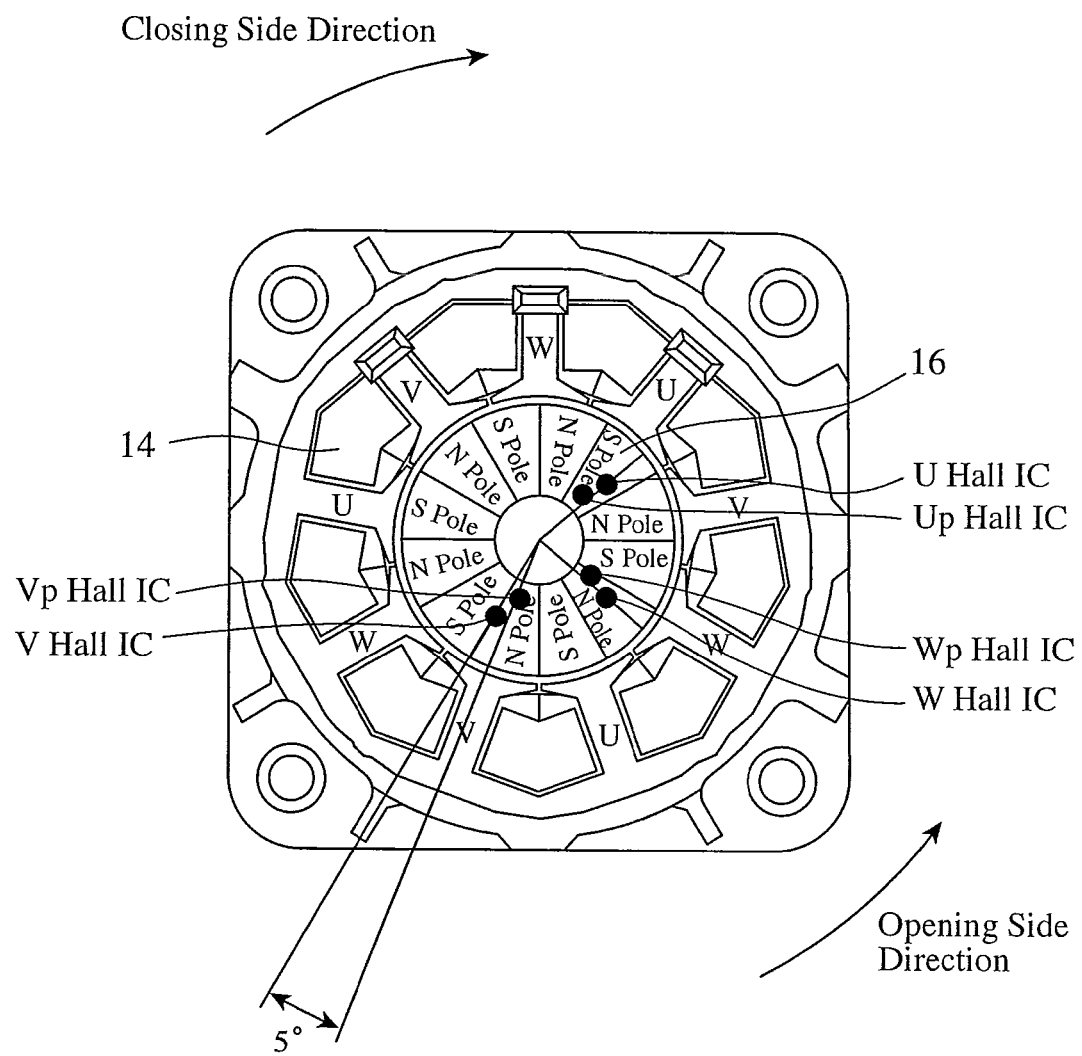
FIG. 18 is a view of a brushless motor device in accordance with Embodiment 2 of the present invention when viewed from an upper face of the brushless motor device.

FIG. 18 is a view of the brushless motor device 1 when viewed from an upper face of the brushless motor device 1. The number of slots of a stator 14 of this brushless motor device 1 is "9", the number of poles of a rotor 12 is "12", and the number of poles of a magnet 16 for magnetic pole position detection is "12". The magnet 16 for magnetic pole position detection is constructed in such a way that each of its poles corresponds to each pole of the rotor 12.

The Hall ICs 18 which are arranged opposite to the magnet 16 for magnetic pole position detection are comprised of six Hall ICs including a U Hall IC, a V Hall IC, a W Hall IC, a Up Hall IC, a Vp Hall IC, and a Wp Hall IC. In this case, the Up Hall IC, the Vp Hall IC, and the Wp Hall IC (collectively referred to as "sub Hall ICs 18b" from here on) are arranged at positions which are shifted respectively from the positions of the U Hall IC, the V Hall IC, and the W Hall IC (collectively referred to as "main Hall ICs 18a" from here on) by a predetermined offset. The offset is one-twelfth of the angle of each pair of an N pole and an S pole which constructs the magnet 16 for magnetic pole position detection (a mechanical angle of 60 degrees, an electrical angle of 360 degrees), and is equal to a mechanical angle of 5 degrees (an electrical angle of 30 degrees). The main Hall ICs 18a correspond to main Hall elements of the present invention, and the sub Hall ICs 18b correspond to sub Hall elements of the present invention.

FIG. 19 (a) is a view showing a relation among the energizing direction, the electrical angle, the mechanical angle, and the outputs of the Hall ICs 18 when the brushless motor device operates under normal conditions. When causing the rotor 12 to rotate in the direction of opening the valve 21, the energization is repeated for each of the coils of the U, V, and W phases of the stator 14 in order of V→U, W→U, W→V, U→V, U→W, and V→W. In contrast, when causing the rotor 12 to rotate in the direction of closing the valve 21, the energization is repeated for each of the coils of the U, V, and W phases of the stator 14 in order of U→V, U→W, V→W, V→U, W→U, and W→V.

FIG. 19(b) shows a relation among the energizing direction, the electrical angle, the mechanical angle, and the outputs of Hall ICs when a single-precision brushless motor device including a magnet for magnetic pole position detection having 12 poles and three Hall ICs operates under normal conditions, for comparison with the brushless motor device of this embodiment. In this case, the single-precision brushless motor device can simply control the rotational position of its rotor 12 with a resolution equal to a mechanical angle of 10 degrees which is twice as many as that of the brushless motor device in accordance with Embodiment 2.

Because the brushless motor device in accordance with Embodiment 2 of the present invention constructed as mentioned above operates in the same way that the brushless motor device in accordance with Embodiment 1 does with the exception that the signals acquired from the main Hall IC 18a and the sub Hall IC 18b vary at intervals of a mechanical angle which is twice that of the brushless motor device in accordance with Embodiment 1 (at intervals of a mechanical angle of 30 degrees), the detailed explanation of the operation of the brushless motor device of this embodiment will be omitted hereafter.

As previously explained, the brushless motor device in accordance with Embodiment 2 of the present invention is a three-phase brushless motor device including a magnet 16 for magnetic pole position detection whose number of poles is 12 which is the same as the number of poles of a rotor 12, like a conventional single-precision brushless motor device, and further includes three sub Hall ICs 18b in addition to three main Hall ICs 18a so as to detect the magnetic pole position. Therefore, the brushless motor device can increase the resolution of rotational position detection of the rotor 12 to twice that of the conventional single-precision brushless motor device. As a result, because the brushless motor device in accordance with this embodiment can be implemented as a quadruple-precision brushless motor device, the resolution of rotational position detection of the rotor can be further improved as compared with the conventional double-precision brushless motor device. Because the number of poles of the rotor 12 is the same as the number of poles of the magnet 16 for magnetic pole position detection in the brushless motor device in accordance with above-mentioned Embodiment 2, the brushless motor device can also use the magnet of the rotor 12 as the magnet for magnetic pole position detection.

INDUSTRIAL APPLICABILITY

As mentioned above, the brushless motor device in accordance with the present invention is constructed as an n-phase brushless motor device that includes a magnet for magnetic pole position detection whose number of poles is twice as many as that of a rotor, and further includes n sub Hall elements in addition to n main Hall ICs elements so as to improve the resolution of rotational position detection of the rotor. Therefore, the brushless motor device in accordance with the present invention is suitable for use in a driving source for driving an actuator used for exhaust gas control of a vehicle, and so on.

The invention claimed is:

1. An n-phase brushless motor device (n is a positive integer) comprising:
   a stator placed at a fixed position;
   a rotor which rotates when said stator is excited sequentially according to a plurality of excitation patterns, said rotor having a predetermined number of poles;
   a magnet for magnetic pole position detection fixed to a face perpendicular to a rotation axis of said rotor, said magnet having a number of poles which is twice as many as that of said rotor;
   n main Hall elements arranged opposite to said magnet for magnetic pole position detection, for detecting a magnetic pole position of said rotor;
   n sub Hall elements arranged opposite to said magnet for magnetic pole position detection in such a way as to have a predetermined offset in a direction of a periphery with respect to said main Hall elements, for detecting the magnetic pole position of said rotor;
   a main counting unit that calculates an actual position "A" of the rotor; and
   a sub counting unit that counts a value of "2" in response to a detected change in an output pattern of said main Hall elements as compared to an output pattern of said sub Hall elements, where counting a value of "2" is accomplished by setting the actual rotor position to 2A;
   where the sub counting unit further counts a value of "1" in response to a detection of the output pattern of said main Hall elements being the same as the output pattern of said sub Hall elements at a predetermined timing, where counting a value of "1" is accomplished, by setting the actual rotor position to 2A+1; and
   a control unit for controlling a rotation of said rotor according to the value counted by said sub counting unit.

2. The brushless motor device according to claim 1, wherein the offset of the sub Hall elements with respect to the main Hall elements is one-twelfth of a mechanical angle formed by a pair of an S pole and an N pole of the magnet for magnetic pole position detection.

3. The brushless motor device according to claim 2, where n is "3", the number of poles of the rotor is "12", and the offset of the sub Hall elements with respect to the main Hall elements is a mechanical angle of "2.5 degrees".

4. The brushless motor device according to claim 1, where the main counting unit performs the counting in response to rising and falling edges of an output signal of the main Hall elements, and the sub counting unit performs the counting at predetermined time intervals.

5. An n-phase brushless motor device (n is a positive integer) comprising:
 a stator placed at a fixed position;
 a rotor which rotates when said stator is excited sequentially according to a plurality of excitation patterns, said rotor having a predetermined number of poles;
 a magnet for magnetic pole position detection formed surrounding a rotation axis of said rotor or fixed to a face perpendicular to the rotation axis of said rotor, said magnet having a same number of poles as that of said rotor;
 n main Hall elements arranged opposite to said magnet for magnetic pole position detection, for detecting a magnetic pole position of said rotor;
 n sub Hall elements arranged opposite to said magnet for magnetic pole position detection in such a way as to have a predetermined offset in a direction of a periphery with respect to said main Hall elements, for detecting the magnetic pole position of said rotor;
 a main counting unit that calculates an actual position "A" of the rotor; and
 a sub counting unit that counts a value of "2" in response to a detected change in an output pattern of said main Hall elements as compared to an output pattern of said sub Hall elements, where counting a value of "2" is accomplished by setting the actual rotor position to 2A,
 where the sub counting unit further counts a value of "1" in response to a detection of the output pattern of said main Hall elements being the same as the output pattern of said sub Hall elements at a predetermined timing, where counting a value of "1" is accomplished by setting the actual rotor position to 2A+1; and
 a control unit for controlling a rotation of said rotor according to the value counted by said sub counting unit.

6. A method of controlling an n-phase brushless motor device, where n is a positive integer, the method comprising:
 providing a stator at a fixed position;
 rotating a rotor when said stator is excited sequentially according to a plurality of excitation patterns, said rotor having a predetermined number of poles;
 detecting a magnetic pole position of said rotor by
  providing a magnet fixed to a face perpendicular to a rotation axis of said rotor, said magnet having at least the predetermined number of poles;
  providing n main Hall elements arranged opposite to said magnet; and
  providing n sub Hall elements arranged opposite to said magnet in such a way as to have a predetermined offset in a direction of a periphery with respect to said main Hall elements;
 first counting a value of "2" in response to a detected change in an output pattern of said main Hall elements as compared to an output pattern of said sub Hall elements, where counting a value of "2" is accomplished by, for an initial actual rotor position of A, setting the actual rotor position to 2A;
 second counting a value of "1" in response to a detection of the output pattern of said main Hall elements being the same as the output pattern of said sub Hall elements at a predetermined timing, where counting a value of "1" is accomplished by further incrementing the actual rotor position to 2A+1; and
 controlling a rotation of said rotor according to the first counted value or the second counted value.

7. The method of claim 6, where the magnet has twice the predetermined number of poles.

* * * * *